United States Patent [19]
Ochiai

[11] Patent Number: 5,584,765
[45] Date of Patent: Dec. 17, 1996

[54] BALL SPLINE WITH LINER MEMBER

[75] Inventor: Isao Ochiai, Seki, Japan

[73] Assignee: Nippon Thompson Co., Ltd., Tokyo, Japan

[21] Appl. No.: 271,914

[22] Filed: Jul. 8, 1994

[30] Foreign Application Priority Data

Jul. 21, 1993 [JP] Japan ................. 5-200166

[51] Int. Cl.$^6$ ............... F16C 29/06; F16D 3/06
[52] U.S. Cl. ........................................ 464/168
[58] Field of Search ................. 464/35, 36, 167, 464/168, 169

[56] References Cited

U.S. PATENT DOCUMENTS

| | | | |
|---|---|---|---|
| 2,375,030 | 5/1945 | O'Malley | 464/167 X |
| 4,705,491 | 11/1987 | Andersson | 464/167 |

FOREIGN PATENT DOCUMENTS

| | | | |
|---|---|---|---|
| 1228149 | 8/1960 | France | 464/167 |
| 2225605 | 6/1973 | Germany | 464/167 |
| 3730393 | 3/1989 | Germany | 464/167 |
| 63-152719 | 6/1988 | Japan. | |
| 0560132 | 3/1993 | Japan. | |

*Primary Examiner*—Daniel P. Stodola
*Assistant Examiner*—Emmanuel W. Marcelo
*Attorney, Agent, or Firm*—Browdy and Neimark

[57] ABSTRACT

This ball spline consists of a spline shaft provided with first raceway grooves, and a cylindrical casing mounted on the spline shaft so that the cylindrical casing can be moved slidingly on and relatively to the spline shaft. The cylindrical casing has a cylindrical casing body, end caps fixed to both ends of the cylindrical casing body, end seals attached to end surfaces of the end caps, and balls rolling between the spline shaft and cylindrical casing body. The cylindrical casing body consisting of a cylindrical casing member provided with return passages and formed out of a metal or synthetic resin material, and a liner member fitted in the cylindrical casing member and provided with second raceway grooves in which the balls roll.

3 Claims, 7 Drawing Sheets

BALL SPLINE WITH LINER MEMBER

BACKGROUND OF THE INVENTION

1. Field of the Invention

This invention relates to a ball spline having a spline shaft provided with a plurality of raceway grooves, a cylindrical casing moved relatively on the spline shaft and provided with raceway grooves, and balls rolling between the raceway grooves in the spline shaft and those in the cylindrical casing.

2. Description of the Prior Art

Figure 10:
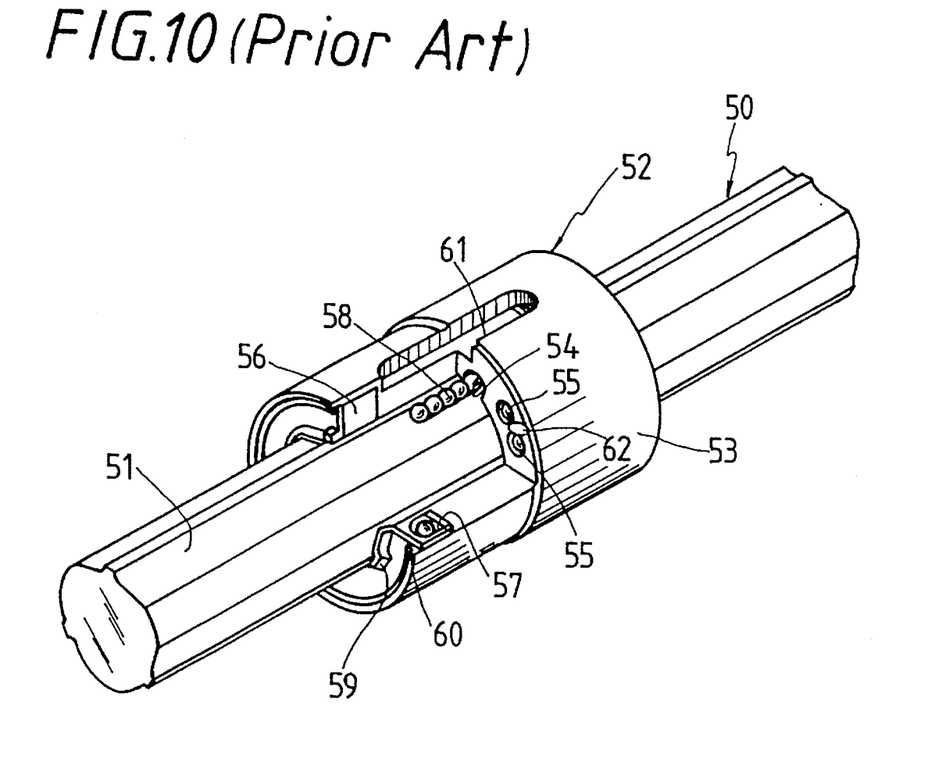
FIG. 10 is a perspective view of an example of a conventional ball spline.

There is a known ball spline shown in FIG. 10. This ball spline consists of a spline shaft 50 having support portions at both end parts thereof, and a substantially cylindrical casing 52 moved relatively on the spline shaft 50. The spline shaft 50 is provided with a plurality of raceway grooves 51 in the longitudinal side surfaces thereof. The cylindrical casing 52 is provided with raceway grooves 54 opposed to the raceway grooves 51. Between the raceway grooves 51 in the spline shaft 50 and those 54 in the cylindrical casing 52, raceways along which a plurality of balls 58 roll are formed. The cylindrical casing 52 has a cylindrical casing body 53 provided with return passages 55 and raceway grooves 54, end caps 56 fixed to both ends of the cylindrical casing body 53 and provided with direction switching passages 57, and balls 58 circulatingly rolling along the raceways, direction switching passages 57 and return passages 55. Each of the end caps 56 is provided on its end surface with a side surface seal 59 and a snap ring 60. The cylindrical casing body 53 is provided with a keyway 61 at which the casing body 53 is to be fixed to another part, and an oil hole 62 for a lubricant. Such a ball spline is capable of increasing the cross-sectional area of a spline shaft to the highest possible level, and constitutes a spline bearing in which the cylindrical casing 52 makes an endless linear movement smoothly on the spline shaft 50. A ball spline is applied to the portion of an industrial robot and a transfer machine which has a single shaft and receives a radial load and torque simultaneously.

Figure 8:
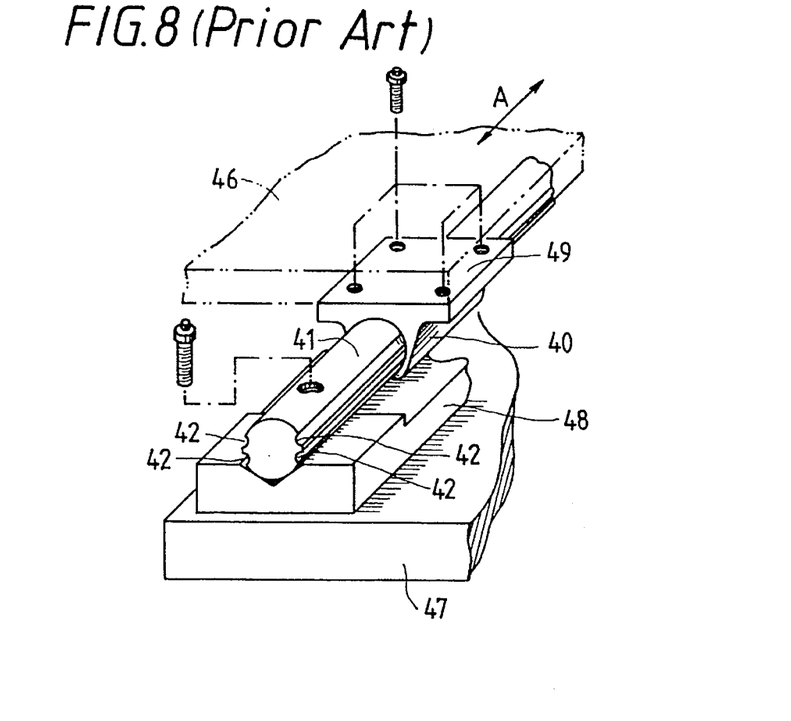
FIG. 8 is a perspective view of an example of a conventional rotation transmission bearing device.
Figure 9:
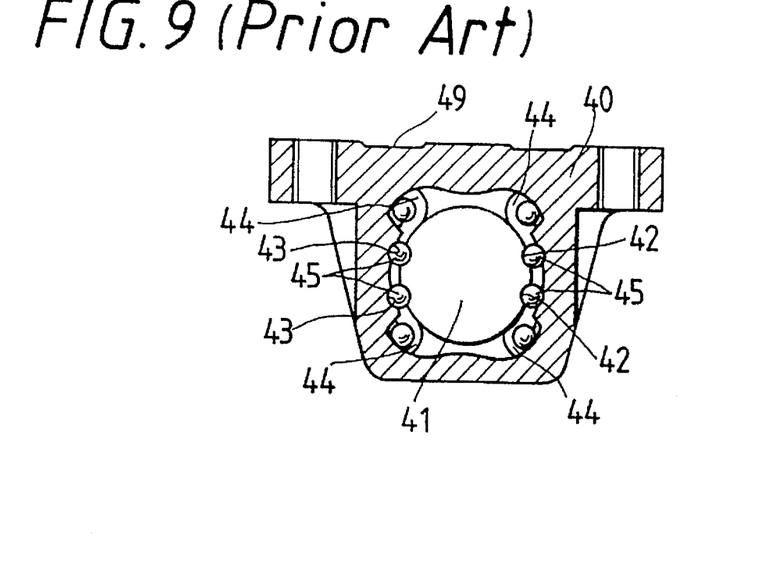
FIG. 9 is a sectional view of the rotation transmission bearing device of FIG. 8.

Japanese Patent Laid-Open No. 152719/1988 discloses a rotation transmission bearing device shown in FIGS. 8 and 9. This rotation transmission bearing device consists of a spline shaft 41 of a substantially circular cross section provided with two raceway grooves 42 in each of two longitudinally extending side surfaces thereof, and a slider 40 having a circulating passage composed of raceway grooves 43 and return passages 44 both of which are formed in a cylindrical inner surface thereof. The slider 40 has a mounting surface 49 on which another part 46 is to be mounted, and a plurality of balls 45 incorporated therein rolling in a raceway between the raceway grooves 42 in the spline shaft 41 and the raceway grooves 43. The slider 40 is mounted on the spline shaft 41, and adapted to be moved linearly in the directions of an arrow A as it is guided by the spline shaft 41. A block 48 is set on a bed 47. The spline shaft 41 is supported on the block 48.

Japanese Patent Laid-Open No. 60132/1993 discloses a miniaturized direct-acting rolling guide unit. This miniaturized direct-acting rolling guide unit enables a V-shaped groove to be formed in an upper surface of a base, and a track shaft having a substantially circular cross section to be set easily and accurately in the V-shaped groove, and also makes it possible to easily set a precision measuring instrument and semiconductor equipment on such a base.

Recently, the above-described bearing device or miniaturized direct-acting rolling guide unit has been incorporated into not only an industrial robot and a machine tool but also automobile parts and various kinds of machines, i.e., the range of the use of the bearing device and rolling guide is increasing. Especially, a direct-acting rolling guide unit which enables a track shaft, i.e. a spline shaft to be formed to a smaller diameter has been in increasing demand.

However, regarding the production of a direct-acting rolling guide unit, the productivity of a spline shaft can be increased to a certain extent but a cylindrical casing moved relatively, i.e., moved slidingly on a spline shaft has problems concerning the productivity and manufacturing cost thereof. Namely, since it is necessary that the surfaces of the raceway grooves in a cylindrical casing be smooth and abrasion-resistant, so as to permit the balls to roll smoothly thereon, polishing the inner surface of the cylindrical casing is required, and this causes the productivity of the cylindrical casing to lower and the manufacturing cost thereof to increase. Therefore, in order to manufacture a cylindrical casing for a conventional ball spline, the inner surface of a small diameter of the cylindrical casing has to be polished, and this makes it difficult to produce the cylindrical casing at a low cost and in large quantities.

SUMMARY OF THE INVENTION

A primary object of the present invention is to solve these problems, and provide a ball spline which has a spline shaft formed to a largest possible cross-sectional area relatively to a cylindrical casing, whereby the inexpensive mass-production of a cylindrical casing is rendered possible, and which enables the cylindrical casing to be combined with the spline shaft stably so that the cylindrical casing can be moved smoothly on and relatively to the spline shaft, whereby an industrial robot, a transfer machine and automobile parts can be combined with the cylindrical casing to enable a radial load and torque to be imparted simultaneously and stably to such machines and parts.

Another object of the present invention is to provide a ball spline having a spline shaft provided with support members at both end portions thereof, and first raceway grooves in the longitudinally extending side surfaces thereof, and a cylindrical casing moved slidingly on and relatively to the spline shaft, characterized in that the cylindrical casing consists of a cylindrical casing body provided with return passages in a no-load region and second raceway grooves opposed to the first raceway grooves, end caps fixed to both ends of the cylindrical casing body and provided with direction switching passages in a no-load region, and balls rolling in raceways in a load region formed between the first and second raceway grooves, especially, the cylindrical casing body being composed of a cylindrical casing member provided with the return passages, and a liner member fitted firmly on an inner surface of the cylindrical casing member and provided with the second raceway grooves.

The cylindrical casing body in this ball spline consists of the cylindrical casing member and liner member, and parts in which the second raceway grooves requiring accuracy and hardness are provided are formed in the liner member.

The liner member is formed very easily and at a low cost by deep drawing a shell of a thin steel plate, and heat treating the liner member enables a suitable level of rigidity to be given thereto, and an elasticity to be given to the portions thereof in which the second raceway grooves are formed. A material capable of giving after it has been heat treated the portions of the liner member in which the second raceway grooves are formed such a predetermined level of hardness that permits these portions to have an abrasion resistance and a deformation resistance may be selected as a material for the production of the liner member.

In this ball spline, the second raceway grooves in the liner member have an effect of springs, i.e., an elasticity. Therefore, when the prepressure of the liner member is set to a slightly high level, a buffer action thereof can be displayed with respect to a sudden load.

Where the cylindrical casing is not required to have a high rigidity, it can be formed by casting a metal or molding a synthetic resin. When the cylindrical casing is formed by casting a metal, the accuracy of the cylindrical casing member can be increased by polishing the inner surface thereof, and the cylindrical casing member can be produced easily at a low cost.

In this ball spline, longitudinal grooves are formed in the inner surface of the cylindrical casing member, and longitudinally extending projections on the outer surface of the liner member. Accordingly, the cylindrical casing member and liner member can be positioned only by press fitting the liner member in the cylindrical casing member with the longitudinally extending projections of the former fitted in the longitudinally extending grooves in the latter, during the assembling of the cylindrical casing body. Therefore, the cylindrical casing body can be assembled easily with a high accuracy.

The liner member is provided with locking members at an end portion thereof, and the cylindrical casing member locking recesses in an end surface thereof, the locking members being fitted firmly in the locking recesses. In this ball spline, second raceway grooves are formed along the inner surfaces of the longitudinally extending projections of the liner member.

In the ball spline according to the present invention, the cost of material for the cylindrical casing member is low, and this casing member can be processed and molded very inexpensively. The producing of the cylindrical casing body by assembling the cylindrical casing member and liner member together can be done at a greatly reduced cost and in large quantities.

DESCRIPTION OF THE PREFERRED EMBODIMENTS

Figure 1:
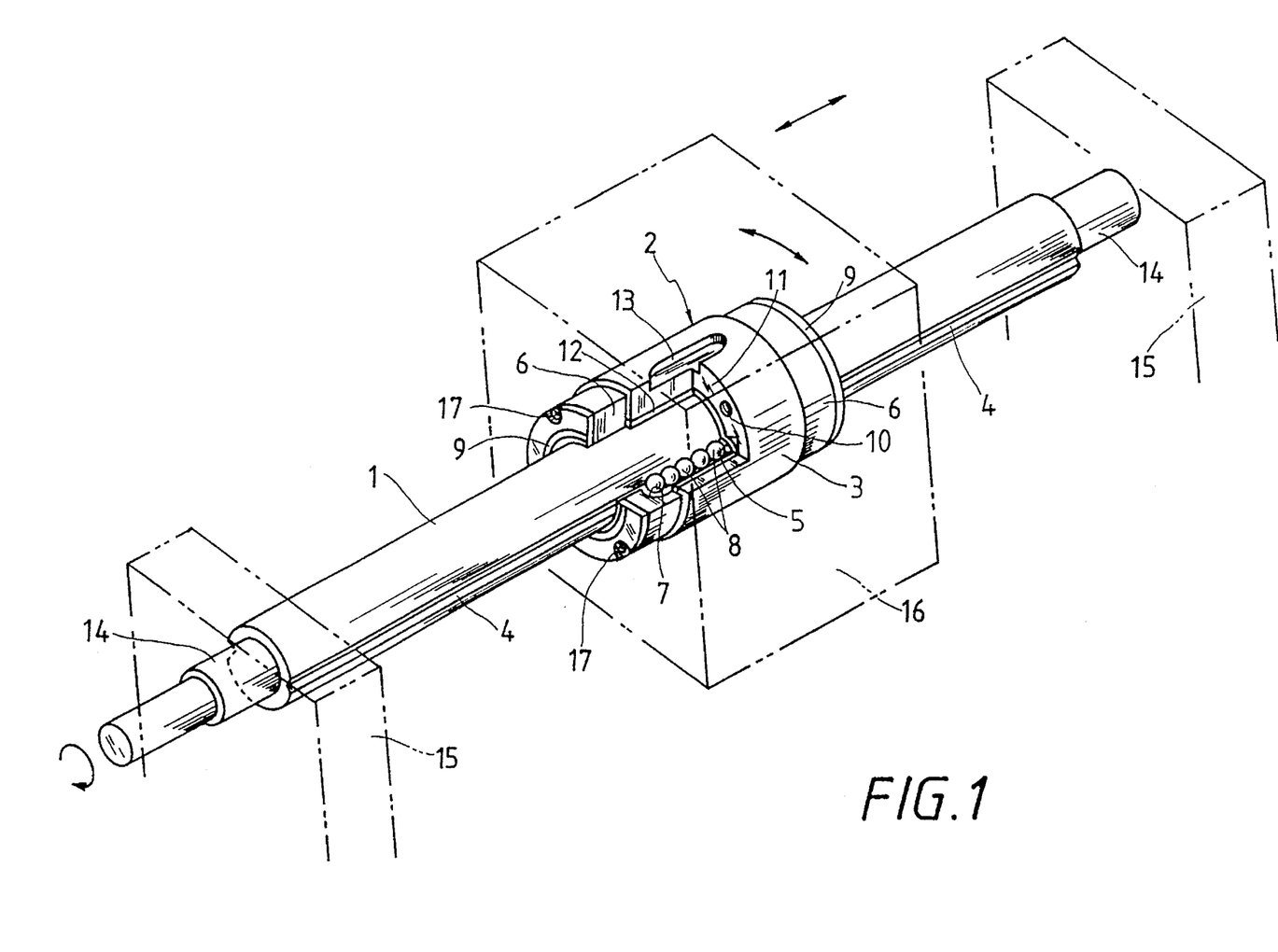
FIG. 1 is a partially cutaway view in perspective of an embodiment of the ball spline according to the present invention.

An embodiment of the ball spline according to the present invention will now be described with reference to the drawings. The ball spline according to the present invention is capable of increasing the cross-sectional area of a spline shaft 1 to as great an extent as possible, on which spline shaft 1 and cylindrical casing 2 make an endless linear movement smoothly as shown in FIG. 1. This ball spline can be applied to the portion of an industrial robot and a transfer machine which has a single shaft and receives a radial load and torque simultaneously. The ball spline consists of a spline shaft 1 provided with support members 14 at both end portions thereof for supporting the spline shaft 1 on bases 15, and a substantially cylindrical casing 2 moving slidingly on and relatively to the spline shaft 1. The spline shaft 1 can be supported on the bases 15 via bearings (not shown), and it can also be fixed non-rotatably to the bases 15. An object 16 to be mounted, such as an automobile part, a machine tool, an industrial robot and a transfer machine is fixed on the cylindrical casing 2.

Figure 2:
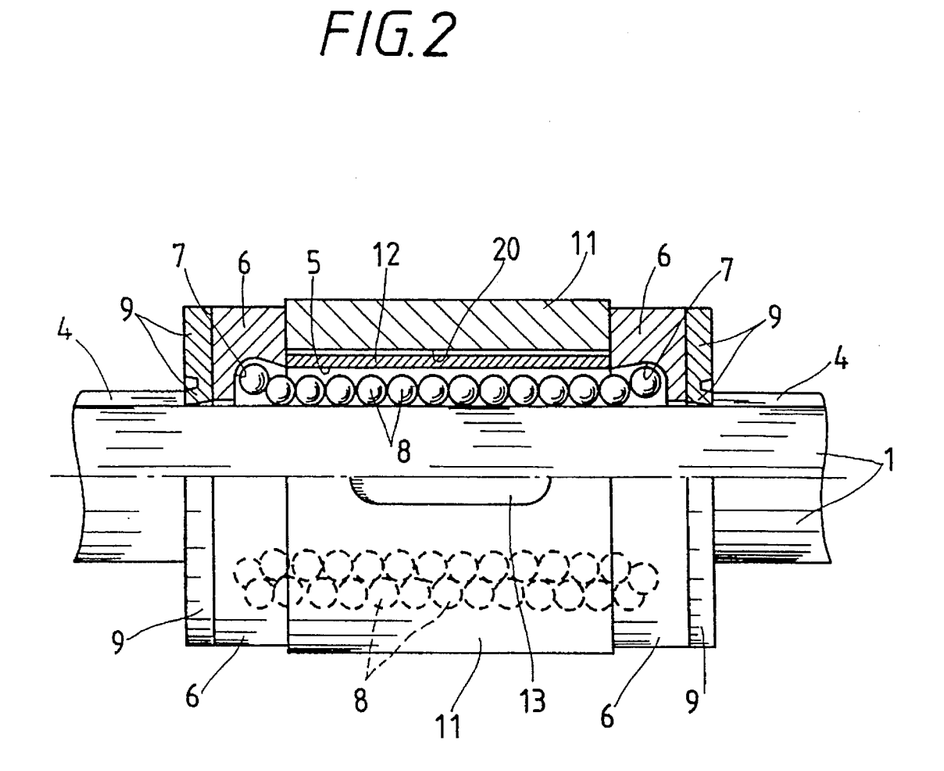
FIG. 2 is a partially sectioned plan of the ball spline of FIG. 1.

In this ball spline, the spline shaft 1 is provided with a plurality of raceway grooves 4 in its longitudinally extending side surface. The cylindrical casing 2 has a cylindrical casing body 3 provided with return passages 10 in a no-load region and raceway grooves 5 opposed to the raceway grooves 4, end caps 6 fixed to both ends of the cylindrical casing body 3, and a plurality of balls 8 rolling in raceways in load regions between the raceway grooves 4, 5. Each of the end caps 6 is provided with direction switching passages 7 in no-load regions for switching the direction of balls 8 and guiding the resultant balls 8 to the relative return passage 10. Accordingly, the balls 8 can be rolled circulatingly (FIG. 2) in the raceways in the load regions formed between the raceway grooves 4 in the spline shaft 1 and those 5 in the cylindrical casing 2, direction switching passages 7 in no-load regions, and return passages 10 in no-load regions. End surface seals 9 are attached to the end surfaces of the end caps 6 by fixing means 17, such as bolts. The bolts are usually screwed to threaded bores 18 (FIG. 3) in the cylindrical casing body 3 through the end caps 6. The cylindrical casing body 3 is provided with a keyway 13 at which the cylindrical casing body 3 is fixed to another part, and an oil hole for a lubricant.

Figure 3:
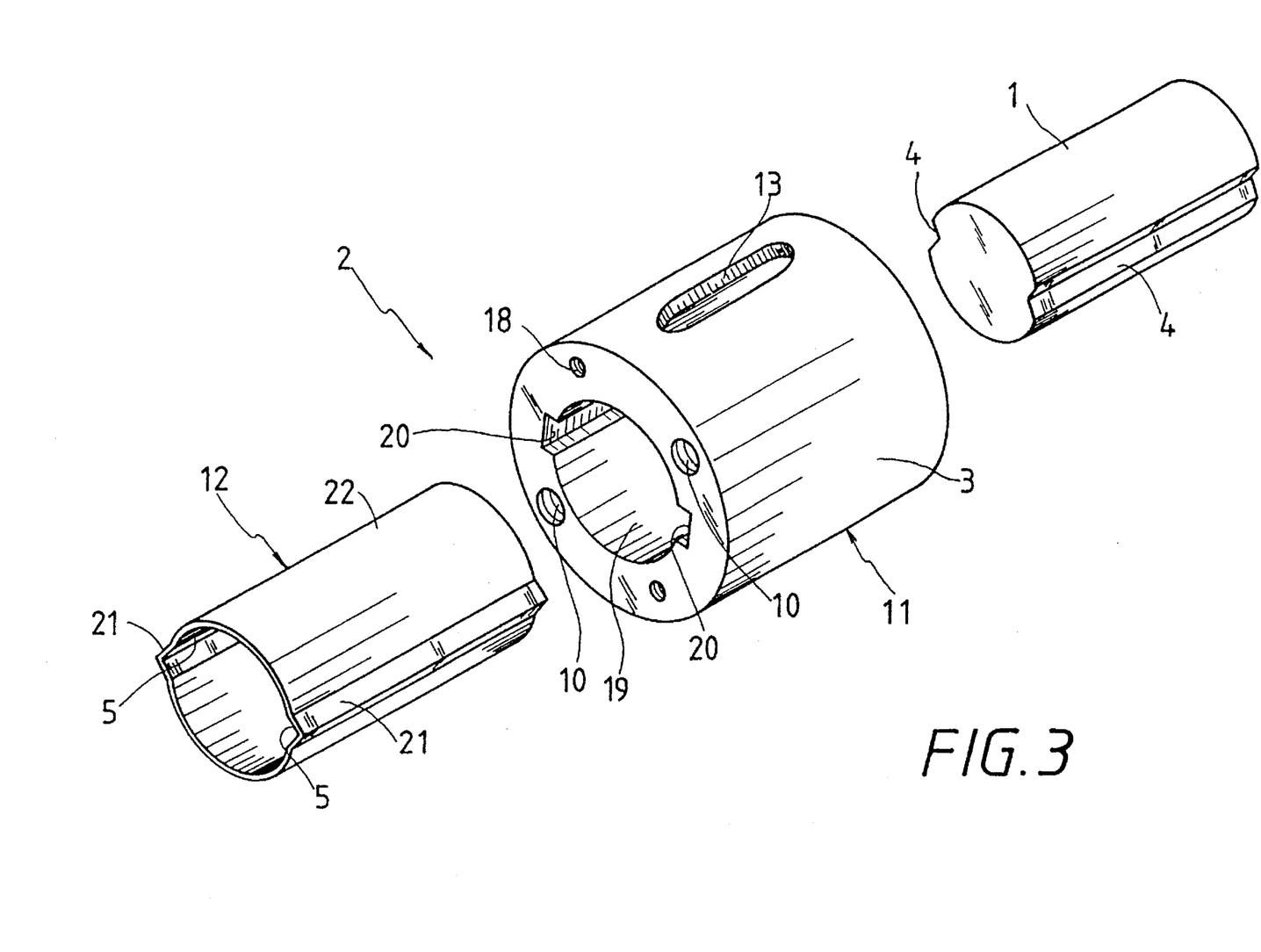
FIG. 3 is an exploded view of a cylindrical casing member, a liner member and a spline shaft in the ball spline of FIG. 1.

This ball spline is characterized in that, especially, the cylindrical casing body 3 consists of the cylindrical casing member 11 provided with return passages 10, and the liner member 12 fitted firmly on the inner circumferential surface of the cylindrical casing member 11 and provided with raceway grooves 5. The cylindrical casing member 11 can be made of a metal material, and, in such a case, an inner surface 19 of the cylindrical casing member 11 is polished and processed to a predetermined accuracy, and a plurality of cross-sectionally square longitudinally extending grooves 20 are formed therein as shown in FIG. 3. Where the cylindrical casing member 11 need not have a high rigidity, nor need be heat treated, it can be produced by casting a metal. Where the cylindrical casing member 11 need not have a high rigidity, it can also be produced by molding a synthetic resin, and the material therefor is not limited to a metal. Accordingly, the cylindrical casing member 11 can be produced at very low costs in terms of material, processing and molding, so that the manufacturing cost of the cylindrical casing body 3 as a whole can be reduced.

As shown in FIG. 3, a plurality of longitudinally extending projections 21 are formed on an outer surface 22 of the liner member 12. The projections 21 on the liner member 12 are so formed that they are press fitted in the grooves 20 in the cylindrical casing member 11 to substantially prevent the cylindrical casing member 11 and liner member 12 from being turned relatively to each other. The projections 21 on the liner member 12 are provided in the inner surfaces thereof with longitudinally extending grooves, which form the raceway grooves 5 in the cylindrical casing 2.

In this ball spline, a molded body constituting the liner member 12 having the above-described shape can be produced easily by deep drawing a thin steel sheet, the deep drawn product being thereafter hardened by a heat treatment so as to give a desired level of rigidity thereto. Since the portions of the liner member 12 thus produced which are provided with projections 21 defining the raceway grooves 5 have some level of elasticity, the spline shaft can be set in the cylindrical casing member 11 with a slightly increased prepressure. Moreover, the positions of the balls contacting the inner surface of become stable and raceway grooves 5 meeting the purpose satisfactorily can be provided.

The cylindrical casing member 11 and liner member 12 constituting the cylindrical casing body 3 in this ball spline can be formed to various shapes. The cylindrical casing members 11 and liner members 12 having various shapes will now be described with reference to FIGS. 6 and 7.

Figure 6:
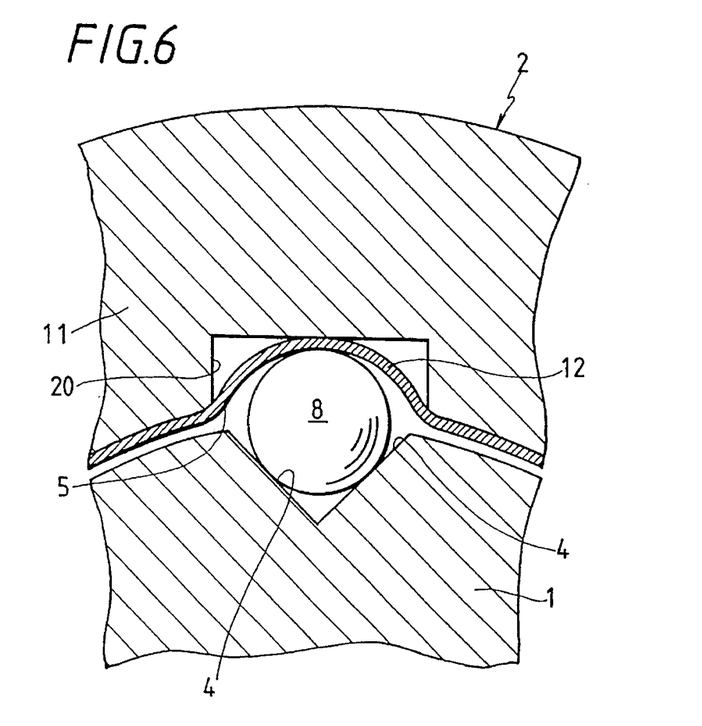
FIG. 6 is a partial section showing the positional relation between the spline shaft, cylindrical casing body and balls in this ball spline.

FIG. 6 is a partial section showing an example of the cylindrical casing body in this ball spline. FIG. 6 shows a liner member 12 in which an arcuate raceway groove 5 is molded. In this ball spline, each ball 8 is supported at a total of three points including one point on the surface of the arcuate raceway groove 5 formed in the liner member 12, and two points on the surface of a V-shaped raceway groove 4 in the spline shaft 1.

Figure 7:
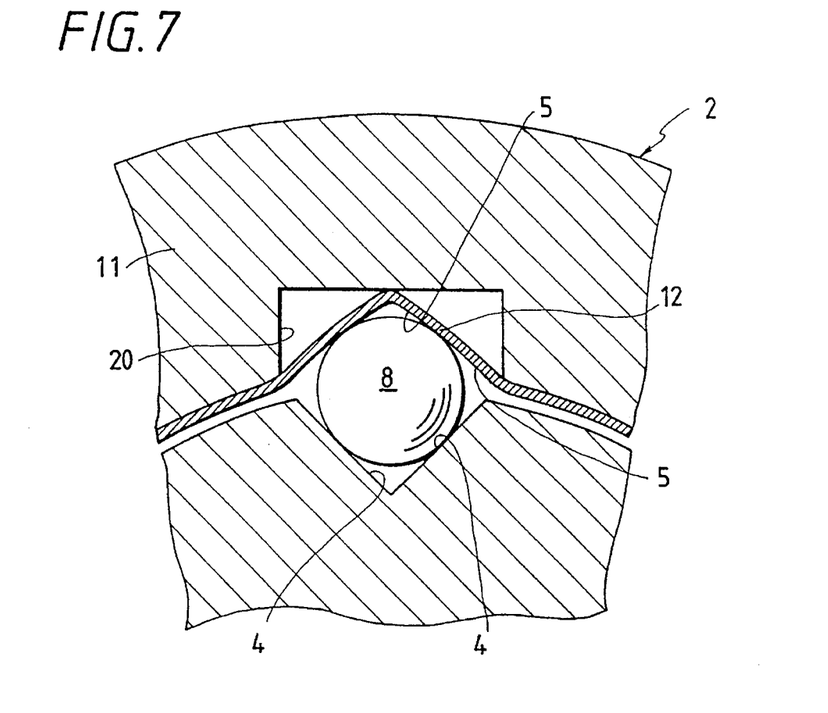
FIG. 7 is a partial section showing another example of the positional relation between the spline shaft, cylindrical casing body and balls in this ball spline.

FIG. 7 is a partial section showing another example of the cylindrical casing body in this ball spline. FIG. 7 shows a liner member 12 in which a raceway groove 5 is molded so that the raceway groove 5 can secure a pointed arch-like shape. In this ball spline, each ball 8 is supported at a total of four points including two points on the surface of the V-shaped raceway groove 5 formed in the liner member 12, and two points on the surface of a V-shaped raceway groove 4 in the spline shaft 1.

Figure 4:
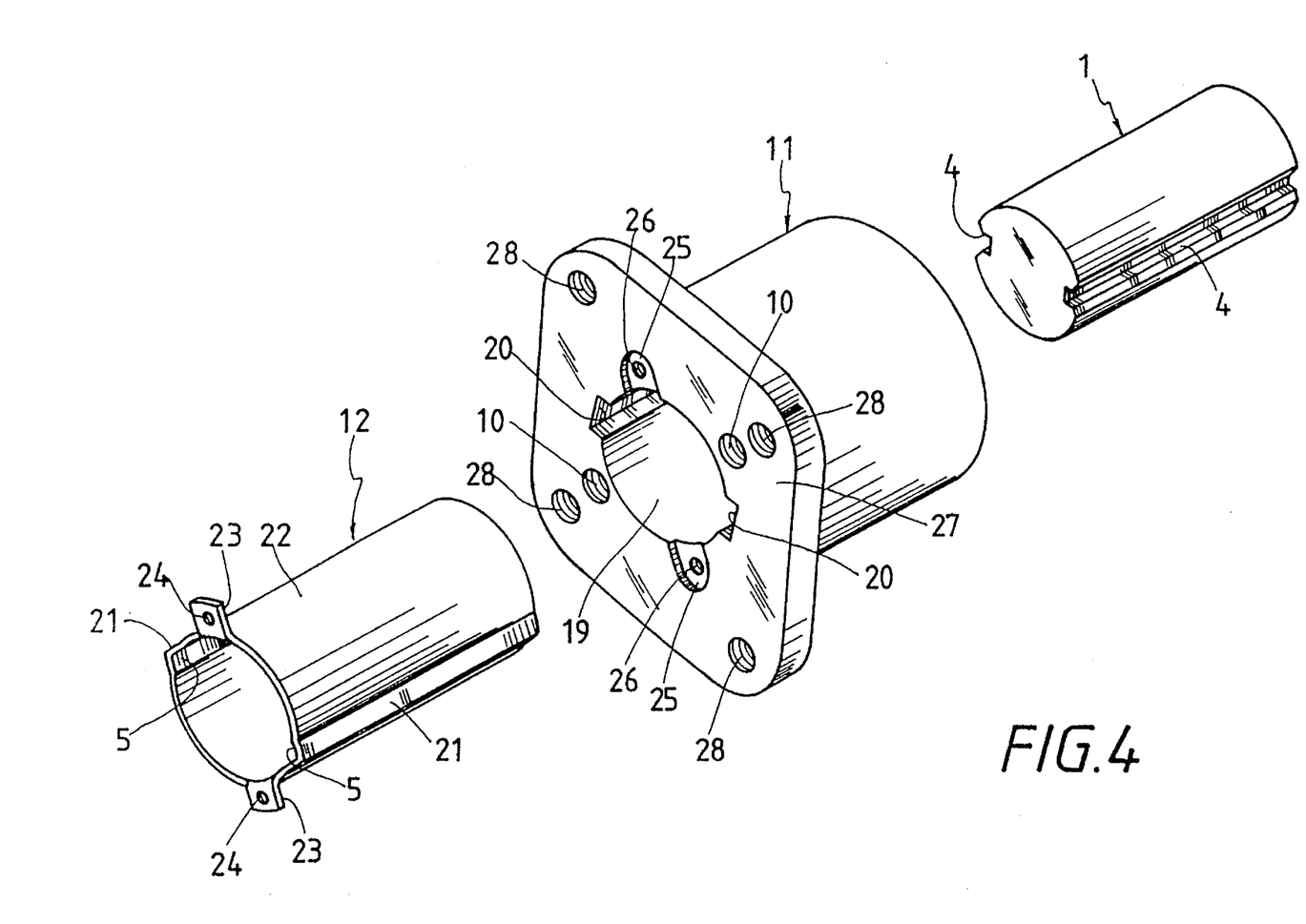
FIG. 4 is an exploded view of another example of slip-rotation-stop means for the cylindrical casing member and liner member which constitute a cylindrical casing body in this ball spline.
Figure 5:
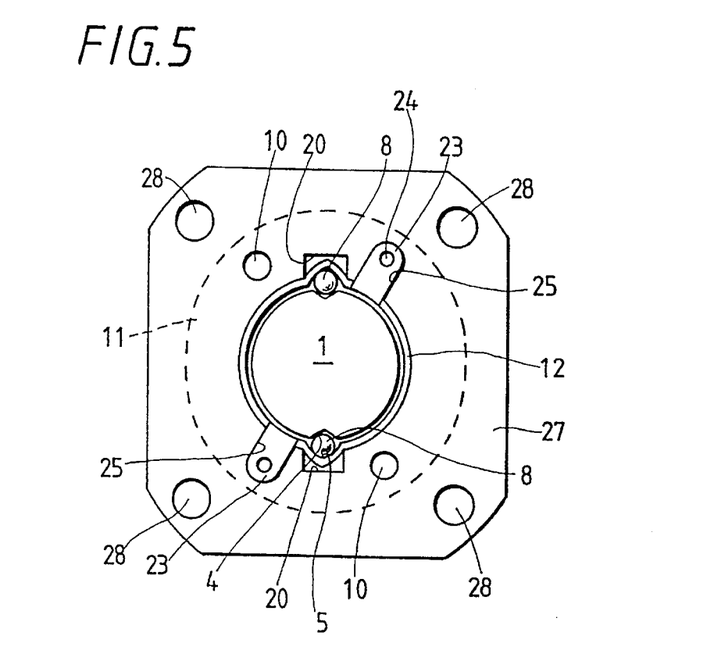
FIG. 5 is an end view of the slip-rotation-stop means for the cylindrical casing body of FIG. 4.

Another embodiment of this ball spline will now be described with reference to FIGS. 4 and 5. Since this embodiment has construction identical with that of the embodiment of FIG. 3 except that the end portions of the cylindrical casing member 11 and liner member 12 of the former embodiment are formed differently from those of the same parts of the latter, the same parts are designated by the same reference numerals, and the duplication of descriptions thereof is avoided. The cylindrical casing body in this ball spline consists of a cylindrical casing member 11 and a liner member 12, and the cylindrical casing member 11 is provided with a flange 27 in which mounting holes 28 are formed. This ball spline has a slip-rotation-stop means for positively preventing the relative rotation of the cylindrical casing member 11 and liner member 12 when the projections 21 of the liner member 12 are press fitted into the grooves 20 in the cylindrical casing member 11.

In this ball spline, locking members 23 and locking recesses 25 are provided as a slip-rotation-stop means on an end portion of the liner member 12 and in an end surface of the cylindrical casing member 11 respectively, and the locking members 23 are positioned and fitted in the locking recesses 25. The locking members 23 are provided with holes 24, and the locking recesses 25 with threaded holes 26. The liner member 12 is positioned in the cylindrical casing member 11 and fixed firmly thereto so that these members are not relatively turned, by inserting screws into the threaded holes 26 in the locking recesses 25 through the holes 24 in the locking members 23.

What is claimed is:

1. A ball spline comprising:

(a) a spline shaft provided with support members at both end portions thereof and first raceway grooves in longitudinally extending side surfaces thereof;

(b) a cylindrical casing moved slidingly on and relatively to said spline shaft, said cylindrical casing comprising a cylindrical casing body, provided with return passages in a no-load region, and end caps fixed to both ends of said cylindrical casing body and provided with direction switching passages in the no-load region, said cylindrical casing body including a cylindrical casing member provided with said return passages, said cylindrical casing member being provided with an annular surface having longitudinally extending grooves and annular inner surface portions between adjacent grooves and an annular liner member fitted firmly to said annular inner surface portions of said cylindrical casing member in continuous contact therewith, said liner member being provided on an outer surface thereof with longitudinally extending projections, said longitudinally extending projections being fitted in said longitudinally extending grooves with said liner member fitted in said cylindrical casing member, said projections defining second raceway grooves, said second raceway grooves of said liner member being formed along inner surfaces of said longitudinally extending projections formed on said liner member, said liner member being positioned with respect to said cylindrical casing member by fitting said longitudinally extending projections on said liner member into said longitudinally extending grooves in said cylindrical casing member; and (c) balls rolling circulatingly in raceways in a load region formed between said first raceway grooves and said second raceway grooves, said direction switching passages and said return passages; wherein said liner member is fitted in a pressed state on said cylindrical casing member at raceway portions thereof which are provided with said second raceway grooves in said cylindrical casing member, said second raceway grooves in said liner member having actions of springs with respect to said bails, said liner member having a buffer action with respect to a load imparted to said cylindrical casing; and (d) said liner member is press-fitted into said cylindrical casing member with said longitudinally extending projections formed on said liner member fitted into the longitudinally extending grooves of said cylindrical casing member, such that said liner contacts the annular inner surface portion of the cylindrical casing member adjacent said longitudinally extending grooves.

2. The ball spline according to claim 1, wherein said cylindrical casing member is formed out of one of a metal material and a synthetic resin material.

3. The ball spline according to claim 1, wherein said liner member is provided with locking members at an end portion thereof, said cylindrical casing member being provided with locking recesses in an end surface thereof, said locking members being fitted in said locking recesses, whereby said liner member is fixed to said cylindrical casing member.

* * * * *